US007122913B2

(12) United States Patent
Witten et al.

(10) Patent No.: US 7,122,913 B2
(45) Date of Patent: Oct. 17, 2006

(54) MODULAR POWER GENERATION APPARATUS AND METHOD

(75) Inventors: Eric B. Witten, Long Beach, CA (US); Dana J. Markle, Long Beach, CA (US)

(73) Assignee: Wittmar Engineering and Construction, Inc., Long Beach, CA (US)

( * ) Notice: Subject to any disclaimer, the term of this patent is extended or adjusted under 35 U.S.C. 154(b) by 122 days.

(21) Appl. No.: 10/888,893

(22) Filed: Jul. 9, 2004

(65) Prior Publication Data

US 2006/0006652 A1 Jan. 12, 2006

(51) Int. Cl.
*F02B 43/08* (2006.01)
*B60L 1/02* (2006.01)
*F01K 15/00* (2006.01)
*B61D 43/00* (2006.01)

(52) U.S. Cl. .............................. 290/1 A; 290/2; 123/3

(58) Field of Classification Search ................ 290/1 A, 290/1 R, 2; 123/2, 3
See application file for complete search history.

(56) References Cited

U.S. PATENT DOCUMENTS 3,602,730 A * 8/1971 Cushing ..................... 307/150
3,700,834 A * 10/1972 Schaefer ................ 191/12.2 R
4,136,432 A * 1/1979 Melley, Jr. ................... 29/469
RE30,229 E * 3/1980 Berman et al. ............. 290/1 R
4,262,209 A 4/1981 Berner
4,686,375 A * 8/1987 Gottfried ....................... 290/2
4,700,567 A * 10/1987 Frey et al. ............... 73/152.39
4,759,560 A * 7/1988 Virgulti ................... 280/47.26
4,992,669 A * 2/1991 Parmley ..................... 290/1 R
6,145,780 A * 11/2000 Fontana ................... 242/588.1
6,309,268 B1 10/2001 Mabru
6,340,005 B1 1/2002 Keast
6,435,925 B1 8/2002 Mabru
6,450,133 B1 9/2002 Bernard et al.
6,564,774 B1 5/2003 Ellims et al.
6,579,137 B1 6/2003 Mabru
6,644,247 B1 * 11/2003 Campion ....................... 123/2
6,700,214 B1 * 3/2004 Ulinski et al. ............ 290/40 C
6,765,304 B1 * 7/2004 Baten et al. ................ 290/1 A
2002/0072282 A1 6/2002 Mabru
2002/0148438 A1 10/2002 Ellims et al.
2002/0177374 A1 11/2002 Mabru
2003/0030279 A1 * 2/2003 Campion .................... 290/1 A
2003/0030281 A1 2/2003 Campion
2003/0173828 A1 9/2003 Bachinski et al.

FOREIGN PATENT DOCUMENTS

GB 2365929 A 2/2002
JP 359006144 A * 1/1984
JP 05113108 A 5/1993
WO WO-0216195 A1 2/2002

OTHER PUBLICATIONS

Environ International Corporation, *Cold Ironing Cost Effectiveness Study*, vol. 1- Report, Mar. 30, 2004, pp. 1-128, Port of Long Beach, Long Beach, California, U.S.A.
European Sea Ports Organisation, *Low emission shipping*, Sep. 29, 2003, Brussels, Belgium.

* cited by examiner

*Primary Examiner*—Julio Gonzalez
(74) *Attorney, Agent, or Firm*—Shimokaji & Associates, P.C.

(57) ABSTRACT

The present invention provides a method and apparatus for providing temporary electrical power to stationary locations and moveable locations. For example, vessel marine power systems may be directed to the reduction and elimination of air pollutants produced when using a ship's generator while at dock. The power system is modular, portable, and generates electricity over a wide range of voltages and frequencies.

19 Claims, 6 Drawing Sheets

MODULAR POWER GENERATION APPARATUS AND METHOD

BACKGROUND OF THE INVENTION

The present invention relates generally to switching the frequency of electrical power provided by power modules and, more particularly, to systems and methods for the reduction and elimination of air pollutants by providing electrical power by power modules.

Electrical generators are commonly used for temporarily generating electricity for small loads at facilities that are remote or mobile. One current disadvantage with many such generators is that they use diesel fuel, which creates a very high quantity of air pollution. A commonly used type of diesel fuel is bunker fuel, which is one of the most air polluting fuels that can be used. Additionally, such generators commonly lack catalytic converters and other pollution control devices to minimize air pollution.

Another disadvantage of current generators is that they are built for a specific installation or use. In other words, such electrical generators are single voltage and single frequency systems and cannot be used at multiple sites that may have different voltage and frequency requirements.

The limited use of generators is evident in many environments, such as the marine environment. There is a lack of uniformity in electrical equipment used internationally. Some on-board electrical equipment may function with 50 or 60 Hz alternating current (AC). The same electrical equipment may need a voltage of 110, 220, 380, 400, 480, or even 600 volts. For a ship traveling internationally, its ability to connect to an onshore generator (which can vary from country to country) will be limited to the electrical compatibility between the generator and onboard equipment (which can also vary from country to country based on the ship's origin). Thus, the ability of a port to provide electrical power to the ship's onboard equipment will be limited to the electrical compatibility between the generator and onboard equipment.

Providing a range of voltage generation or frequency generation has required using more than one generator and more than one transformer. However, it is unfeasible to equip a port with multiple generators and multiple transformers. Doing so would require much space, huge investment costs, and increased safety risks.

Another problem is that a ship may berth at different locations of the same port depending on the type and size of cargo. Installation of an extensive electrical cable network would be required to connect a stationary generator or electrical source at a berth for ships at various locations within a port.

One attempt to provide a solution to the above problems is disclosed in U.S. Pat. No. 6,644,247 to Campion ("Campion"). A frequency switching system for portable power modules includes a turbocharger operatively connected to a motor and has interchangeable components that allow selecting a first or second turbocharger configuration. Frequency output may be varied by interchanging turbochargers, and voltage switching is accomplished by operating a voltage switch. To switch electrical frequencies, the design described in the Campion patent requires connecting and disconnecting integral portions of the frequency switching system. For example, the design described in the Campion patent involves switching frequency by disconnecting a first driving portion of a turbocharger from an exhaust duct, disconnecting the first driving portion from a turbocharger bypass, disconnecting the first driving portion from an exhaust gas manifold, disconnecting the first driving portion from a driven portion, and making connections between a second driving portion and corresponding locations previously disconnected from the first driving portion. Thus, much mechanical work is required to change the frequency output.

Besides the mechanical concerns in changing frequency output, Campion lacks effective methods for reducing air pollution and/or taking advantage of pollution control incentives offered by environmental regulatory agencies. Those agencies often offer financial incentives for reducing air pollution. For example, if an electrical power plant reduces air pollution by adopting technology that reduces emissions, then the environmental regulatory agency may issue the operator of the electrical power plant with pollution credits. A pollution credit is an incentive for reduction in air pollutants that may be used by the polluter to offset excess air pollutants at another facility. A pollution credit may be bought, sold, banked, or traded. For example, if the operator of the electrical power plant has another facility that is environmentally regulated, then the operator may use the pollution credits earned from the electrical power plant to offset pollution "penalties" for the other facility. If the operator of the electrical power plant desires to not use the pollution credits, then the operator may sell the pollution credits to operators of other facilities who can, in turn, use the credits to offset their penalties.

As can be seen, there is a need for an improved apparatus and methods for providing electrical power to varying electrical equipment having varying frequency and voltage needs, needing minimal use of space and capital equipment, being portable, being easily switchable between electrical frequencies and electrical voltages, and providing reduced air pollution.

SUMMARY OF THE INVENTION

In one aspect of the present invention, a method for changing a frequency of electrical power provided by a power module comprises determining a first frequency of electrical power provided by the power module; engaging a first governor to maintain the first frequency of electrical power provided by the power module; determining a second frequency of electrical power provided by the power module; and engaging a second governor to maintain the second frequency of electrical power provided by the power module.

In an alternative aspect of the present invention, a method for changing a voltage of electrical power provided by a power module comprises adjusting voltage of the electrical power provided by the power module with a voltage regulator; and wherein the voltage is adjusted independently of frequency of the electrical power.

In another aspect of the present invention, a method for providing electrical power from a first location to a second location comprises operating a motor; driving an electrical generator connected to the motor; selecting a first electrical frequency; controlling the electrical generator with a first governor and a second governor; engaging the first governor to maintain the first electrical frequency of electrical power; selecting a first electrical voltage; and delivering electrical power, at the first electrical frequency and the first electrical voltage, via a cable connected between the electrical generator and a power connection box.

In yet another aspect of the present invention, a method for providing power from a port to a ship electrical system comprises operating a motor positioned within a container;

driving an electrical generator positioned within the container and driveably connected to the motor; selecting a first electrical frequency; controlling the electrical generator with a governor; controlling the rotational speed of the electrical generator with a speed controller; selecting a first electrical voltage; selecting a second electrical frequency; and delivering power, at the second electrical frequency and the selected first electrical voltage, via a cable connected between the electrical generator and a power connection box.

In a further aspect of the present invention, a method for providing power from a port to a ship comprises operating a gaseous fuel motor positioned within a container; driving a constant speed, variable load electrical generator positioned within the container and driveably connected to the gaseous fuel motor; selecting a first electrical frequency; controlling an electrical frequency produced by the electrical generator with a first governor; selecting a second electrical frequency; selecting a first electrical voltage; regulating the first electrical voltage with an adjustable voltage regulator; controlling the second electrical frequency produced by the electrical generator with a second governor; delivering power, at the second electrical frequency and the first electrical voltage, via a cable connected between the electrical generator and a power connection box.

In a still further aspect of the present invention, an apparatus for providing temporary power from a generator to an electrical system comprises a container; a gaseous fuel motor positioned within the container; a constant speed, variable load electrical generator driveably connected to the gaseous fuel motor; a first governor to maintain a first electrical frequency of electrical power provided by the constant speed, variable load electrical generator at the first electrical frequency; a second governor to maintain a second electrical frequency of electrical power provided by the constant speed, variable load electrical generator at the second electrical frequency; and a first speed controller and a second speed controller for controlling the rotational speed of the electrical generator.

In yet a still further aspect of the present invention, a power module for providing switchable power comprises a container; a motor positioned within the container; a generator connected to the motor; a first governor to maintain a first frequency of electrical power provided by the generator at the first frequency; a second governor to maintain a second frequency of electrical power provided by the generator at the second frequency; and an adjustable voltage regulator to adjust a voltage of the power provided by the generator.

In a still further aspect of the present invention, an electrical power network comprises a ship; a dock adjacent the ship; a gaseous fuel motor at the dock; a generator connected to the gaseous fuel motor; a first governor to maintain a first electrical frequency of electrical power provided by the generator at the first electrical frequency; a second governor to maintain a second electrical frequency of electrical power provided by the generator at the second electrical frequency; a first speed controller and a second speed controller for controlling the rotational speed of the generator; an adjustable voltage regulator to adjust a voltage of the power provided by the constant speed, variable load electrical generator; a power connection box; a generator cable for delivering the electrical power to the power connection box; and a cable connected between the power connection box and a vessel electrical system.

These and other aspects, objects, features and advantages of the present invention, are specifically set forth in, or will become apparent from, the following detailed description of an exemplary embodiment of the invention when read in conjunction with the accompanying drawings.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention is useful for switchable power delivery with selectable frequency and voltage settings. "Switchable power" is intended to refer to electrical power that is capable of being changed in frequency and/or voltage without mechanically connecting or disconnecting portions of a generator or motor. Additionally, the invention is useful for reducing pollution by using cleaner fuels for generating electricity and emissions controls for a motor driving a generator. The invention is useful for generating electrical power during electrical outages, or for providing auxiliary power supply. One such use is for marine vessels such as ships, boats, barges, and other watercraft that require auxiliary electrical power of a particular frequency and voltage while the vessel is berthed. The invention is also useful for providing power to vehicles, such as aircraft or trucks.

Prior art service generators may use bunker fuel, while the present invention may use a cleaner fuel, such as natural gas, liquefied natural gas, liquefied petroleum gas, and the like for generating electricity. The air pollution that is otherwise generated from bunker fuel is effectively reduced by instead using cleaner burning fuel motor of the present invention such that the pollution reduction may be 99% for $No_x$ and CO and 100% for $PM_{10}$ (particulate matter).

Internationally, electrical systems often have different standard electrical frequencies (e.g., 50 Hz and 60 Hz) and standard electrical voltages (e.g., 110, 220, 380, 400, 480, and 600 volts). To build a power plant at a first stationary or non-stationary (moveable) location to provide electrical power to a second stationary or non-stationary (moveable) location, multiple generators and transformers have been needed at great capital expense to provide different electrical frequencies and different electrical voltages.

In contrast, the present invention can use one generator with two governors and two speed controllers to select a desired electrical frequency and/or a desired electrical voltage. Instead of disconnecting, assembling, and re-connecting generator components as has heretofore occurred (such as disconnecting a driving portion from an exhaust system to change a turbocharger), selecting frequencies and voltages may be accomplished by merely activating a governor to open and close a fuel valve to regulate motor rotation to set frequency and adjusting a voltage regulator to set output voltage, according to the present invention.

Figure 1:
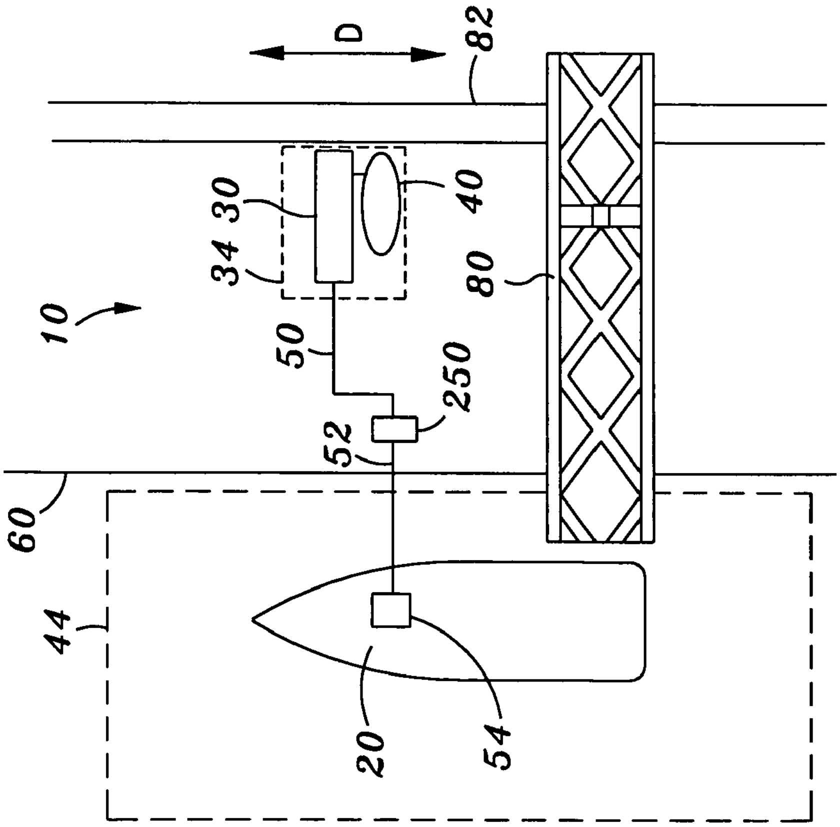
FIG. 1 is a schematic of an electrical power network, according to an embodiment of the present invention.

In more specifically describing the present invention, and as can be appreciated from FIG. 1, the present invention provides an electrical power network 10 for providing electrical power from a first location 34 to a second location 44. The electric power network 10 may comprise a power module 30, which may be situated at the first location 34. The first location 34 may, as an example, be a dock 60 in a port. The network 10 may further include a fuel tank 40 to supply fuel to the power module 30. The fuel tank 40 may supply natural gas, liquefied natural gas, liquefied petroleum gas, propane, ultra low sulphur diesel ("California diesel"), and the like. The power module 30 may supply electrical power, via a generator cable 50, to a power connection box 250. A cable 52 of the network 10 may be connected from the power connection box 250 to supply electrical power to the second location 44 which may, for example, be a ship 20 docked at a berth. An electrical system 54 may be a type of electrical equipment known in the art for distributing electric power at the second location 44, such as onboard the ship 20.

The electrical power network 10 may also include a machine 80, such as a crane, for raising and lowering the power module 30 and transporting the power module through a lateral distance D, and thereby move the power module 30 from one location to another. For example, the machine 80 may move the power module 30 from a truck (not shown) to the first location 34. Besides being moveable by the machine 80, the portable power module 30 may be moveable, such as by a forklift (not shown) and trailerable, such that the portable power module 30 may be transported, such as by a standard 18-wheel truck and trailer (not shown), from one location to another location.

Figure 2:
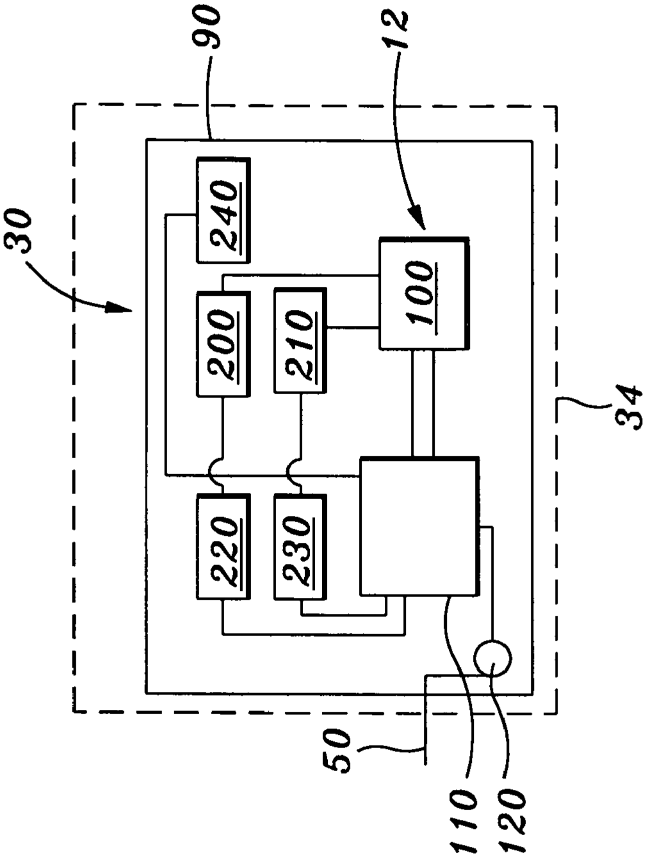
FIG. 2 is a block diagram of an apparatus for providing electrical power from one location to another location, according to an embodiment of the present invention.

As shown in the block diagram in FIG. 2, the power module 30 may comprise a motor 100, which may be positioned within a container 90. The motor 100 may be, for example, a gaseous fuel motor or a turbocharged after-cooled engine. The motor 100 may be driveably connected to drive a generator 110, which may be, for example, a constant speed, variable load electrical generator.

A first governor 200 and a second governor 210 may control the production of electric power from the generator 110 by controlling the rotational velocity of the generator 110. The first and second governors 200, 210 can be well-known governors and may be, for example, a type manufactured by the Woodward Company of Fort Collins, Colo., U.S.A. The governors 200, 210 may be of the electromechanical type that operate by extending a rod to contact a fuel valve (such as a butterfly valve) of the motor 100, and thereby open and close the fuel valve. The opening and closing of the fuel valve can regulate the fuel supply to the motor 100, and thereby regulate the rotational speed of the generator 110. In turn, the electrical frequency produced by the generator 110 is regulated (i.e., selected). The governors 200, 210 may be calibrated to regulate fuel supply in relation to motor 110 speed such that increasing and decreasing fuel supply rate respectively increases and decreases the motor 110 speed.

One governor (for example, first governor 200) may be used to set the generator 110 to a first frequency (e.g., 50 Hz) and a second governor (for example, second governor 210) to set the generator 110 to a second frequency (e.g., 60 Hz). For example, the first governor 200 may be calibrated to supply fuel to run the motor 100 at 1000 rpm, which may correspond (depending upon the type of motor 100 and generator 110) to the generator 110 producing electricity at 50 Hz. Likewise, the second governor 210 may be calibrated to supply fuel to run the motor 100 at 1200 rpm, which may correspond to the generator 110 producing electricity at 60 Hz. In another example, the first governor 200 may be calibrated to set motor 100 speed to 1500 rpm to produce 50 Hz electricity and the second governor 210 may be calibrated to set motor 100 speed to 1800 rpm to produce 60 Hz electricity.

The generator 110 output electrical frequency may be switched by, for example, turning off the first governor 200 and turning on the second governor 210, to change the electrical frequency from a first frequency to a second frequency (for example, from 50 Hz to 60 Hz). Likewise, generator 110 output electrical frequency may be switched by turning off the second governor 210 and turning on the first governor 200, to change the electrical frequency from a second frequency to a first frequency (for example, from 60 Hz to 50 Hz).

A first speed controller 220 and, optionally, a second speed controller 230 may control the rotational speed of the generator 110, by controlling actuation of the governors 200, 210. The present invention may operate with only the first speed controller 220 or with both the first speed controller 220 and the second speed controller 230. The first and second speed controllers 220, 230 may be digital electronic controllers of a type well known in the prior art.

The first speed controller 220 may be associated with the motor 100, the first governor 200, and the second governor 210 when independent controlling of the first governor 200 and the second governor 210 is not desired or when the second speed controller 230 is malfunctioning. For example, when independent controlling is not needed, the first speed controller 220 may send instructions to deactivate the first governor 200 and activate the second governor 210. The first speed controller 220 may receive feedback from the motor 100 to send corresponding instructions to the first governor 200 and the second governor 210. For example, if the first speed controller 220 senses a decrease in rpm of the motor 100, the first speed controller 220 may send instructions to the first governor 200 and the second governor 210 to open a fuel valve to increase the fuel supply to the motor 100, which would increase the motor speed.

Alternatively, the first speed controller 220 may be associated with the motor 100 and the first governor 200, while the second speed controller 230 may be associated with the motor 100 and the second governor 210 when independent controlling of the first governor 200 and the second governor 210 is desired. When the first speed controller 220 and the second speed controller 230 are both used, then the first speed controller 220 may receive feedback from the motor 100 to send corresponding instructions to the first governor 200 and the second speed controller 220 may receive feedback from the motor 100 to send corresponding instructions to the second governor 210. For example, if the first speed controller 220 senses a decrease in rpm of the motor 100, the first speed controller 220 may send instructions to the first governor 200 to open a first fuel valve (not shown) to increase the fuel supply to the motor 100, which would increase motor speed. Meanwhile, the second speed controller 230 may send instructions to the second governor 210 to open the first fuel valve, and second fuel valve (not shown) when two fuel valves are desired to be operated, to increase the fuel supply to the motor 100, which would increase the motor speed.

An adjustable voltage regulator 240 may be used (manually or automatically) to adjust the generator 110 output electrical voltage to varying amounts, which for example may be set to a value within a group consisting of, for example, ordinarily used voltages, such as 110, 220, 380, 400, and 480 volts. Desirably, the electrical voltage may be adjusted to a value within the range from about 380 volts to about 480 volts, depending on the voltage needed for equipment to be powered. The generator 110 output electrical voltage may be at values other than the ordinarily used voltages of 110, 220, 380, 400, and 480. The generator 110 output electrical voltage may be selected to be any voltage that can be safely delivered. The adjustable voltage regulator 240 may be a rheostat type, such as an adjustable voltage regulator manufactured by the Basler Electric Corporation of Highland, Ill., U.S.A.

In still referring to FIG. 2, the generator cable 50 may connect an electric cable spool 120 to the power connection box 250. The power connection box 250 may permit intermediate connection among various electrical cables to connect to various electrical systems, for example, permitting the generator cable 50 to be connected to the cable 52, which may be connected to the vessel electrical system 54.

Figure 3:
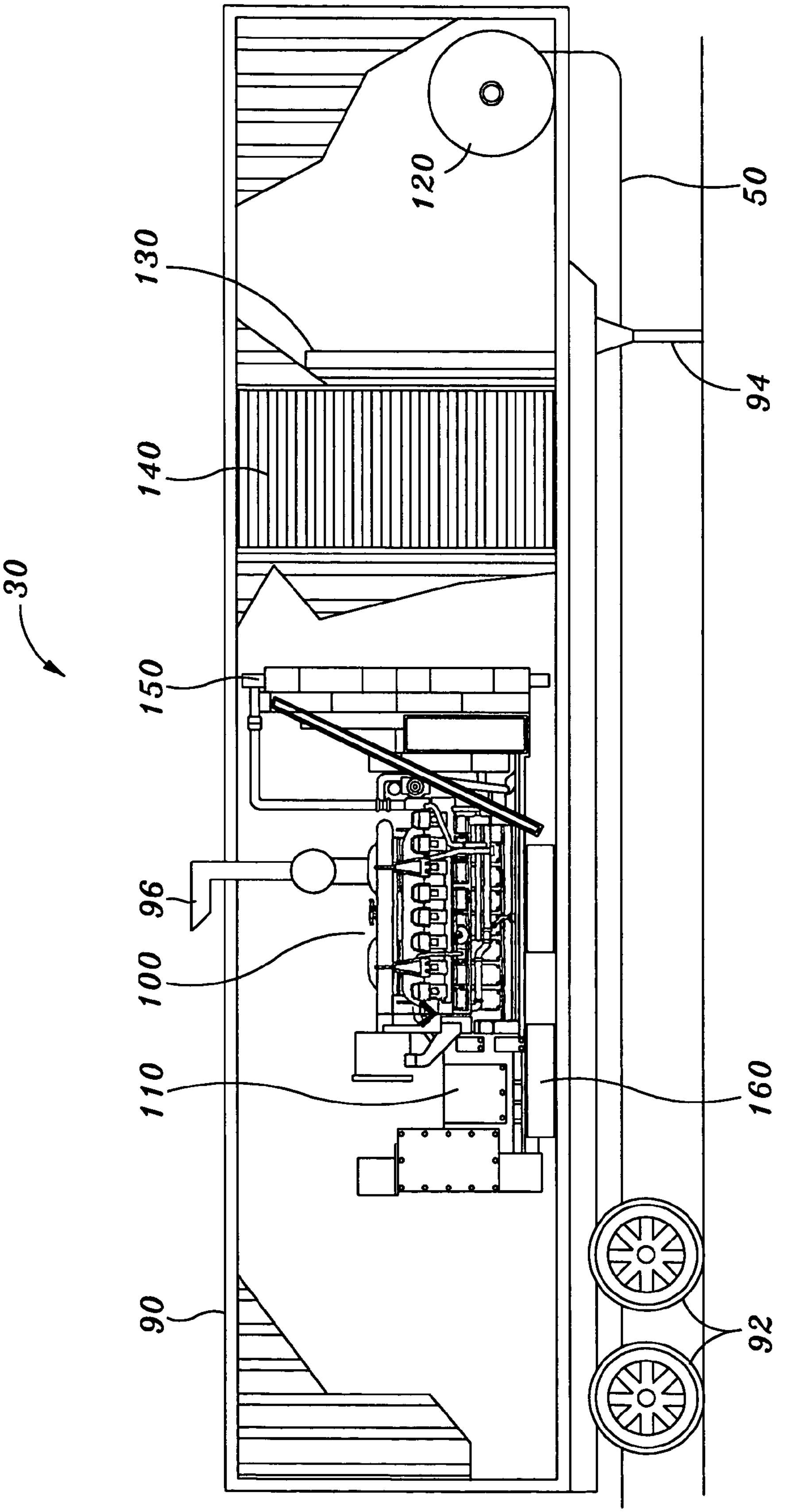
FIG. 3 is a partial sectional view of a power module, according to an embodiment of the present invention.

With reference to FIG. 3, the power module 30 may comprise a container 90. The container 90 may comprise wheels 92 for ground transport and struts 94 for supporting the container 90 when stationary. The container 90 may be a shipping container of a standard type known in the maritime and trucking industries. The electric cable spool 120 for storing lengths of generator cable 50 may be positioned within the container 90. A louvered vent 140, which may provide ventilation for combustion air and cooling of the interior of the container 90, may also be positioned within the container 90. A switch gear 130 may be used to monitor electricity produced from the generator 110 to the second location 44 (shown in FIGS. 1 and 2), such as measuring and reporting amperage, voltage, and frequency. As an example, the switch gear 130 may be of a type made by General Electric Corporation of a brand known as the Zenith Paralleling Switchgear. Exhaust from the motor 100 may exit the container 90 through an exhaust pipe 96. A catalytic converter (not shown) may be affixed to the container 90 and the exhaust pipe 96.

Figure 4:
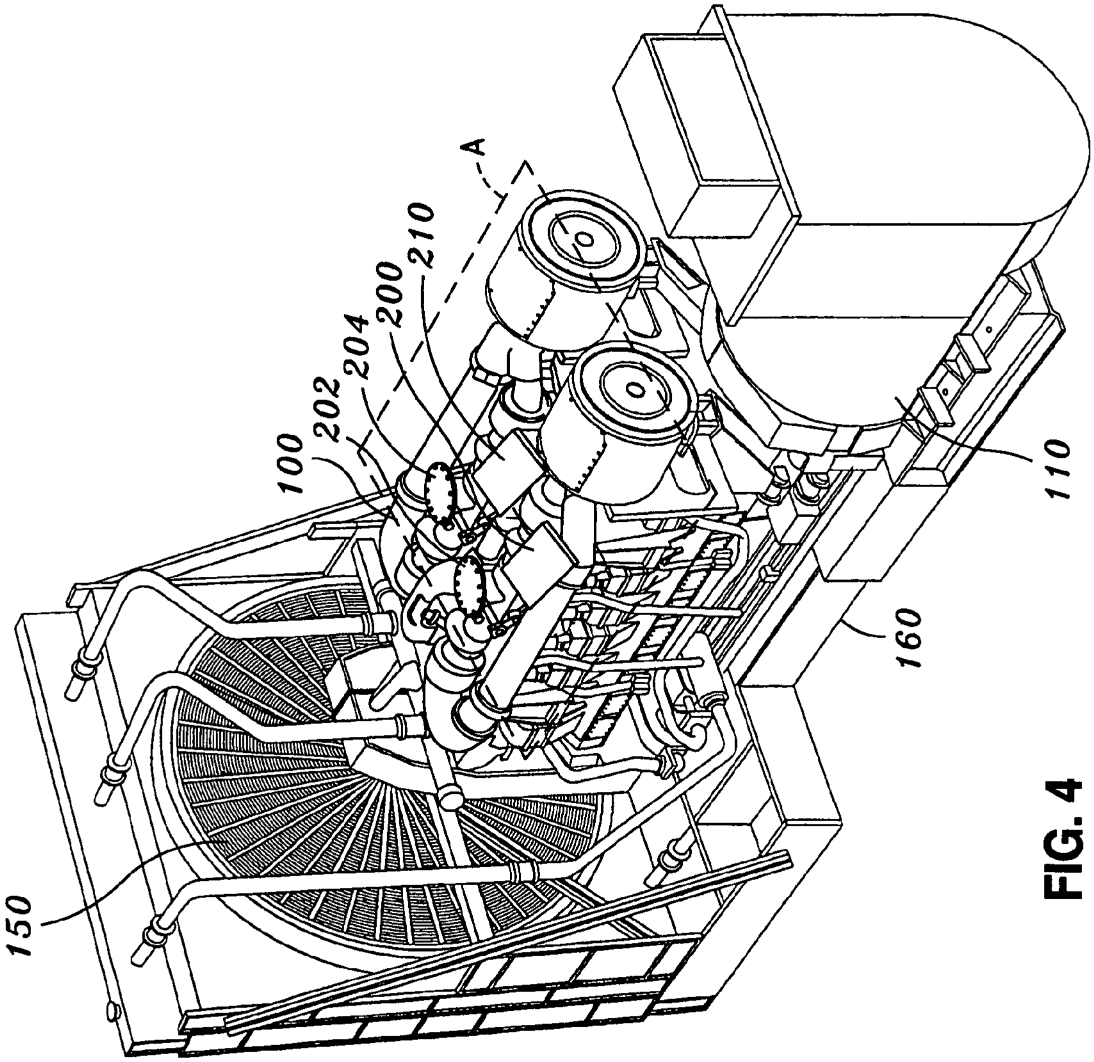
FIG. 4 is a partial, perspective view of a motor and generator of the power module of FIG. 3.

In FIG. 4, the motor 100 and the generator 110 may be attached to a fan 150 for cooling the motor 100. A first fuel introduction device such as a carburetor 202 and an optional second fuel introduction device such as a carburetor 204 may be used to meter fuel for combustion within motor 100. The first carburetor 202 and the second carburetor 204 may be of the type well known in the art to include a butterfly valve (not shown). The first and second carburetor 202, 204 may be opened and closed by the first governor 200. Likewise, the first and second carburetor 202, 204 may be opened and closed by the second governor 210.

Although not shown, it should be understood that the present invention may comprise other arrangements among the first governor 200, the second governor 210, the first carburetor 202, and the second carburetor 204.

A base 160 may support the motor 100 and the generator 110. The base 160 may comprise steel skid rails, such as I-beams. The motor 100 and the generator 110 may be bolted onto the base 160 with spring isolators for vibration isolation during operation. The base 160 may be secured to the container by bolting or welding into the interior of the container.

Figure 5:
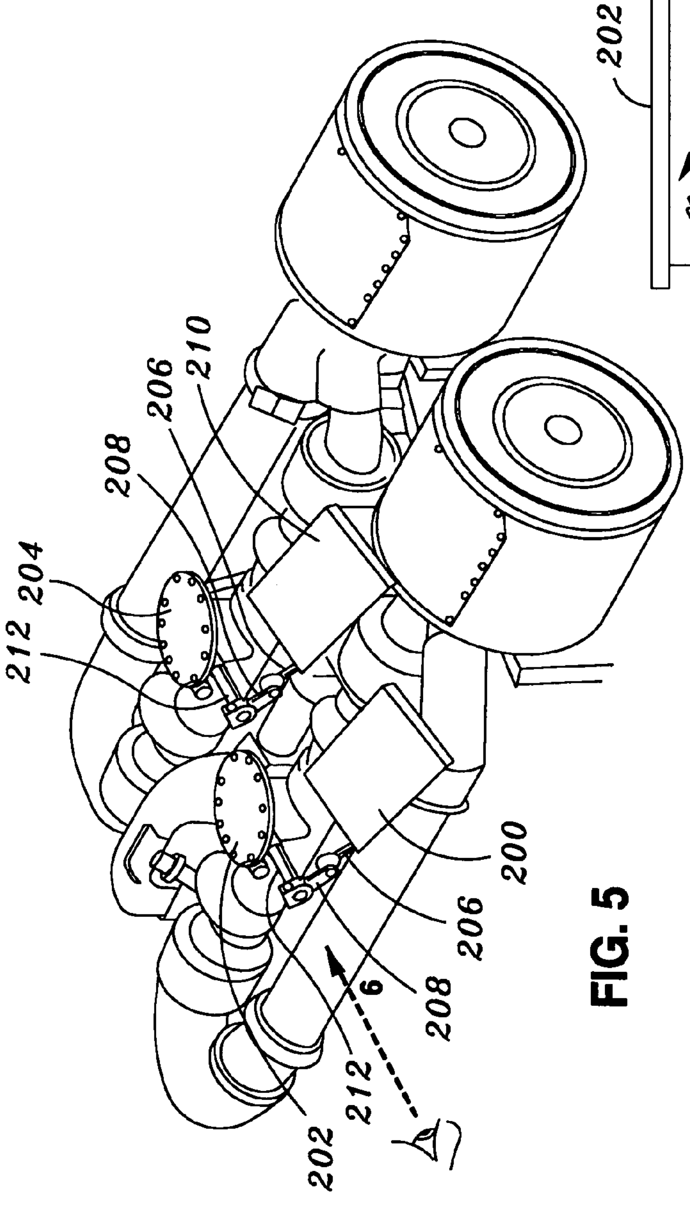
FIG. 5 is an enlarged view of the portion of the motor within section A of FIG. 4.

FIG. 5, which is an enlarged view of Section A of FIG. 4, depicts one arrangement among the governors 200, 210 and the carburetors 202, 204. The first governor 200 and the second governor 210 may each comprise an extension rod 206, which may be connected to a tie rod 208. The tie rod 208 may be connected to a valve rod 212, which may rotate to open and close each carburetor 202, 204.

Figure 6:
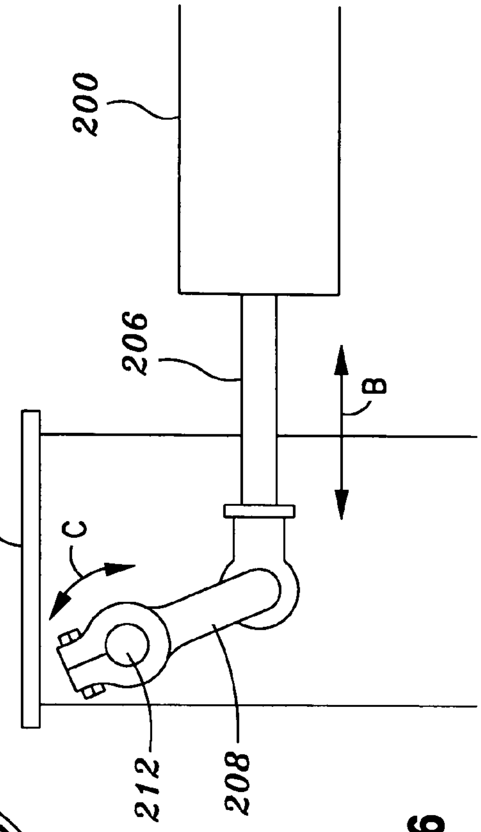
FIG. 6 is a side view, along line 6—6 of FIG. 5.

The relative movement of the extension rod 206, the tie rod 208, and the valve rod 212 is represented in FIG. 6, which is a view, along line 6—6 of FIG. 5. Upon actuation of the first governor 200 (such as by the first speed controller 220, not shown), the extension rod 206 may extend along direction B. Extension of the extension rod 206 may cause rotation of the tie rod 208 along direction C. The valve rod 212 may then rotate along the same direction C. The valve rod 212 may be connected to a butterfly valve (not shown) within the first carburetor 202 to open and close the butterfly valve to start or stop the flow of fuel within the motor 100.

Continuing with FIG. 6, the first governor 200 may be used to open or close the first carburetor 202. To open the first carburetor 202, the extension rod 206 may extend, along direction B, for example, away from the first governor 200. The tie rod 208 may then rotate along direction C, for example, clockwise. The valve rod 212 may then rotate, along direction C, for example, clockwise to open the first carburetor 202. Likewise, to close the first carburetor 202, the extension rod 206 may move, along direction B, towards the governor 200, moving the tie rod 208, along direction C, for example, counterclockwise. The valve rod 212 may then move counterclockwise to close the first carburetor 202.

Figure 7:
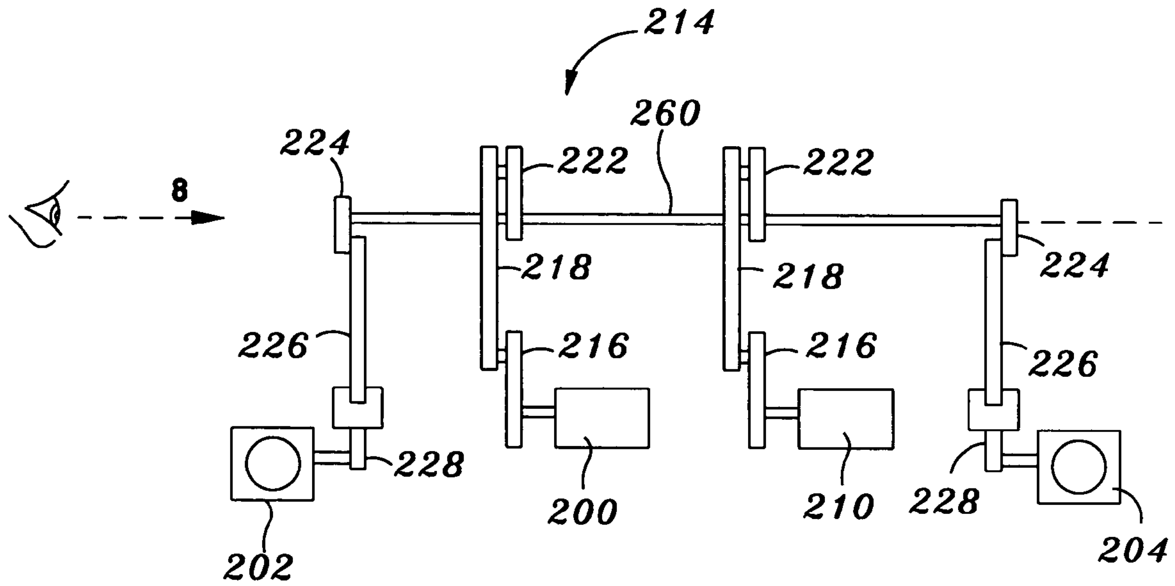
FIG. 7 is a plan view, in isolation, of a linkage system, according to another embodiment of the present invention.

Another embodiment of the present invention is shown in FIG. 7 as a linkage system 214, in isolation, of one arrangement among the governors 200, 210 and the carburetors 202, 204. The first governor 200 and the second governor 210 may each be connected to a governor arm 216, which may be connected to a linkage tie rod 218. The linkage tie rod 218 may be connected to a connector rod 222. Each connector rod may be connected to a linkage rod 260. A translation rod 224 may be connected to a vertical rod 226. The vertical rod 226 may be connected to a carburetor rod 228, which may rotate to open and close the carburetors 202, 204.

Figure 8:
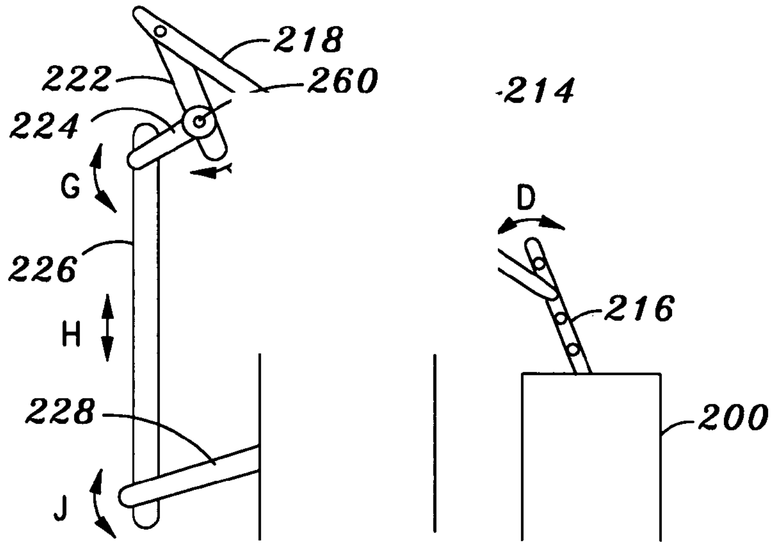
FIG. 8 is a side view, along line 8—8 of FIG. 7.

The relative movement within the linkage system 214 is represented in FIG. 8, which is a view, along line 8—8 of FIG. 7. The governors 200, 210 may act in unison. Upon actuation of the first governor 200 and the second governor 210 (such as by the first speed controller 220, not shown), the governor arm 216 may move along direction D. Movement of the governor arm 216 may cause movement of the linkage tie rod 218 along direction E. The connector rod 222 may then move along direction F to rotate the linkage rod 260 to along the same direction F. The translation rod 224 may then move along direction G to cause vertical rod 226 to move along direction H. Next, the carburetor rod 228 (moving, for example, in direction J) may be connected to a butterfly valve (not shown) within each carburetor 202, 204 to open and close the butterfly valve to start or stop the flow of fuel within the motor 100 (not shown).

Figure 9:
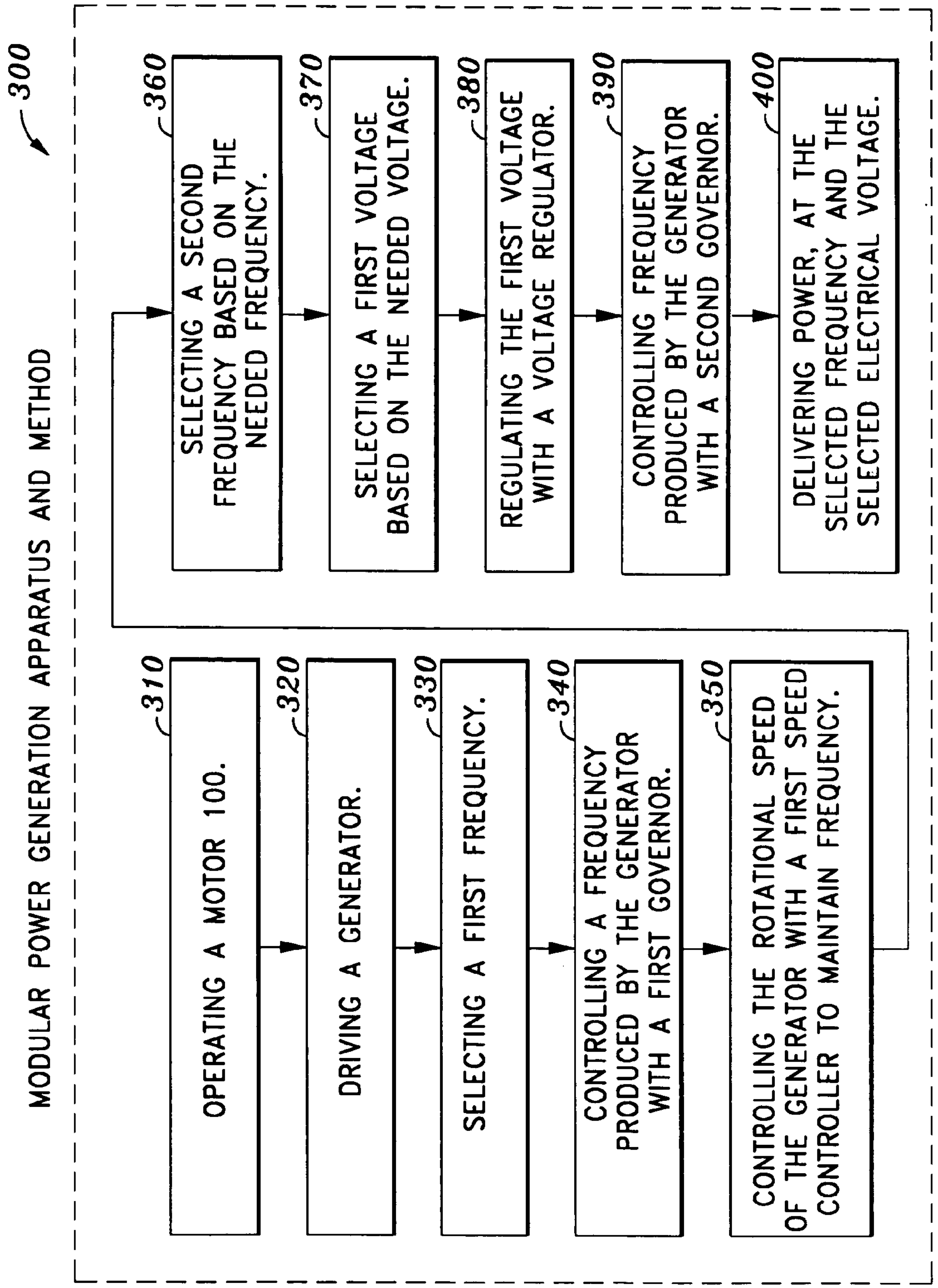
FIG. 9 is a flow diagram of a method for providing electrical power to a location, according to an embodiment of the present invention.

It can be seen in FIG. 9 that the present invention also provides a method 300 for providing power, for example, from a port to a ship. The method 300 may comprise a step 310 of operating a motor 100, which may be positioned within a container 90 for ease of transportation. Thereafter, the method 300 may comprise a step 320 of driving an electrical generator 110, which may be positioned within the container 90. The electrical generator 110 may be driveably connected to the motor 100. The electrical generator 110 may be positioned within the container 90, along with the motor 100, to facilitate portability such that a machine 80 may move the container 90 and that the container 90 may be moved by truck (or other vehicle) without separately moving the electrical generator 110 and the motor 100. Next, the method 300 may continue with a step 330 of selecting a first electrical frequency, based on a previous setting for electrical frequency. Step 340 may comprise controlling the first electrical frequency with a first governor 200. Next, a step 350 may comprise controlling the rotational speed of the electrical generator 110 with a first speed controller 220 to maintain the first frequency. Thereafter, a step 360 may comprise selecting a second electrical frequency based on the needed frequency for the equipment to be powered. Thereafter, the method 300 may comprise a step 370 of selecting a first electrical voltage based on the needed voltage for the equipment to be powered and a step 380 of regulating the first electrical voltage with an adjustable voltage regulator to maintain the selected first electrical voltage. A step 390 may comprise controlling the second electrical frequency produced by the electrical generator 110 with a second governor 210. Thereafter, a step 400 may comprise delivering power, at the second electrical frequency and the first electrical voltage, via a cable 50 connecting the electrical generator 110 and a power connection box 250 from where electrical power compatible with a vessel electrical system (not shown) may be delivered to the vessel electrical system (not shown) to power the vessel's services.

It should be understood, of course, that the foregoing relates to exemplary embodiments of the invention and that modifications may be made without departing from the spirit and scope of the invention as set forth in the following claims.

We claim:

1. An apparatus for providing temporary power, at a selectable frequency, from a generator to an electrical system comprising:

a container;

a hydrocarbon fuel motor positioned within the container adapted to provide a rotating output at varying speeds;

a variable load electrical generator driveably connected to the hydrocarbon fuel motor and adapted to rotate at the same speed as the motor;

a plurality of rotational-speed calibrated governors;

each of the governors having its respective calibrated rotational speed differing from all of the other governors;

each of the governors being connected to a fuel introduction device of the motor and being adapted to control a flow of fuel to the motor to maintain a rotational speed of the motor in accordance with its respective calibration;

each of the governors having a calibrated rotational speed that provides a desired frequency of alternating current output of the generator; and each of the governors being selectively operable independently of the other governors, whereby a desired frequency of current output is attained by operating a selected one of the connected governors.

2. The apparatus of claim 1, further comprising an adjustable voltage regulator to selectively control a voltage of the power provided by the generator at any one of a plurality of different voltages.

3. The apparatus of claim 2, wherein the voltages from the generator output are controlled at values within the range between about 380 volts and about 480 volts.

4. The apparatus of claim 1, wherein at least two of the governors are adapted to provide for a frequency of generator output within the group consisting of 50 Hz and 60 Hz.

5. The apparatus of claim 1, wherein the container encloses an electric cable spool and a switch gear.

6. The apparatus of claim 1, wherein the gas fuel motor is a turbocharged aftercooled engine.

7. The apparatus of claim 1, wherein the generator is positioned within the container.

8. The apparatus of claim 5, further comprising a cable connected between the electric cable spool and a power connection box.

9. The apparatus of claim 8, further comprising a cable connected between the power connection box and the vessel electrical system.

10. A power module for providing switchable power, comprising:

a container;

a motor positioned within the container;

a generator connected to the motor;

a first governor to maintain a first frequency of electrical power provided by the generator at the first frequency;

a second governor to maintain a second frequency of electrical power provided by the generator at the second frequency;

the first and second governors each being connected to a fuel introduction device of the motor;

each of the governors being selectively operable so that alternating current from the generator is produced at either the first frequency or at the second frequency; and an adjustable voltage regulator to adjust a voltage of the power provided by the generator.

11. The power module of claim 10, wherein the generator is a constant speed, variable load electrical generator.

12. The power module of claim 10, wherein the voltage of the power provided by the generator is set to a value within the group consisting or 110, 220, 380, 400, and 480 volts.

13. The power module of claim 10, wherein the power module is trailerable.

14. The power module of claim 10, wherein the power module is moveable by a crane.

15. The power module of claim 10, wherein the power module is moveable by a forklift.

16. The power module of claim 10, wherein the container encloses an electric cable spool and a switch gear.

17. The power module of claim 10, wherein the motor is a turbocharged aftercooled engine.

18. The power module of claim 16, further comprising a cable connected between the electric cable spool and a power connection box.

19. The power module of claim 18, further comprising a cable connected between the power connection box and a vessel electrical system.

* * * * *